United States Patent
Ferrari et al.

(10) Patent No.: US 7,220,088 B2
(45) Date of Patent: May 22, 2007

(54) TOOLHEAD FOR MULTI-AXIS MACHINE TOOLS

(75) Inventors: Maurizio Ferrari, Pizzighettone (IT); Sandro Foletti, Piacenza (IT)

(73) Assignee: JOBS S.p.A., Piacenza (IT)

( * ) Notice: Subject to any disclaimer, the term of this patent is extended or adjusted under 35 U.S.C. 154(b) by 0 days.

(21) Appl. No.: 11/106,579

(22) Filed: Apr. 15, 2005

(65) Prior Publication Data

US 2005/0232714 A1 Oct. 20, 2005

(30) Foreign Application Priority Data

Apr. 16, 2004 (IT) .......................... BO2004A0217

(51) Int. Cl.
*B23B 39/00* (2006.01)
*B23B 35/00* (2006.01)
*B23C 9/00* (2006.01)

(52) U.S. Cl. ...................... 409/204; 409/134; 409/137; 409/211; 409/231; 408/97; 408/61; 408/67; 408/95

(58) Field of Classification Search ................ 409/204, 409/201, 202, 209, 211, 212, 216, 234, 231, 409/144, 137, 136, 134; 408/67, 97, 81, 408/82, 58, 61, 241 G, 241 S; 173/198; 451/456; 29/DIG. 86, DIG. 78, DIG. 94; 483/13; 144/240, 371, 250.12, 251.1, 252.1

See application file for complete search history.

(56) References Cited

U.S. PATENT DOCUMENTS 5,161,921 A 11/1992 Corsi
5,848,859 A 12/1998 Clark
6,231,280 B1 5/2001 Bullen
6,264,590 B1 * 7/2001 Ferrari .......................... 483/13
2002/0104207 A1 * 8/2002 Smith et al. ................. 29/26 A
2003/0049082 A1 * 3/2003 Morrison et al. ............. 408/56
2003/0077132 A1 * 4/2003 Martinez et al. ............ 408/1 R

FOREIGN PATENT DOCUMENTS

| DE | 197 51 209 A1 | 5/1998 |
| DE | 298 04 328 U1 | 7/1998 |
| IT | 1220732 | 6/1990 |
| IT | BO2003A000043 | 1/2003 |

OTHER PUBLICATIONS

U.S. Appl. No. 10/750,959, filed Jan. 2004, Ferrari.

* cited by examiner

*Primary Examiner*—Dana Ross
(74) *Attorney, Agent, or Firm*—Timothy J. Klima

(57) ABSTRACT

A toolhead for use on a multi-axis machine tool consists of a support assembly equipped with a pivoting spindle designed to accept a removable tool-holder, and centered on a machining axis about which a tool clamped to the tool-holder can be driven in rotation. Also forming part of the toolhead is a depth stop affording an active surface substantially transverse to the machining axis and positionable against a surface of a workpiece. The depth stop is mounted to the support assembly and capable of movement along the machining axis between a first position, distanced from the spindle, and a second position of proximity to the spindle. Transducers incorporated into the toolhead are able to sense the position of the active surface relative to the support assembly, and thus used to control the depth to which the workpiece is penetrated by the tool.

24 Claims, 8 Drawing Sheets

TOOLHEAD FOR MULTI-AXIS MACHINE TOOLS

BACKGROUND OF THE INVENTION

The present invention relates to a toolhead for multi-axis machine tools.

A toolhead embodied according to the invention is able to perform drilling, countersinking or other machining operations automatically and to extremely close tolerances, given an approximate knowledge of the surface being machined. In particular, the toolhead disclosed will countersink to a controlled depth on surfaces lying at any height relative to the feed direction of the tool.

The invention can be associated to advantage with numerically controlled multi-axis machine tools as used especially in the aircraft-building industry for drilling and countersinking holes in the outer panels of wing structures and fuselage sections, destined to accommodate rivets. In practice, the heads of the inserted rivets must remain perfectly flush with the outer skin of the aircraft in order to ensure they will not generate turbulence, which would occasion a marked increase in aerodynamic resistance. The present invention finds application nonetheless, and to similar advantage, in other sectors of industry such as that of motor vehicle manufacturing.

The prior art embraces devices able to control drilling or countersinking depth, as disclosed in patent IT 1220732, for instance, which are set up by performing a mechanical adjustment before each machining job, also devices by which machining depth can be monitored continuously and controlled entirely in automatic mode, as disclosed by way of example in application BO2003A 000043 for Italian patent, both of the references mentioned being filed in the name of the present applicant.

Disadvantageously, devices of the prior art type noted above are integrated into the tool-holder mounted to the spindle of a toolhead.

In the case of patent IT 1220732, more exactly, the device in question comprises a tool-holder with a shank that can be attached to the spindle of a machine tool, also a stop cage mechanism associated with the tool-holder by way of a pair of bearings and presenting a pair of cylinders with piston rods that project from both ends. Each rod is connected at one end to a collar, through which the tool is insertable when penetrating the work, and at the opposite end to a mounting plate. The collar is translatable relative to the tool-holder, in a direction parallel to the tool axis. The mounting plate associated with the ends of the rods remote from the tool carries respective micrometer screws that can be locked fast in a selected position by means of stops. Two microswitches are fixed to the toolhead, near the spindle, their axes coinciding with those of the two micrometer screws. The two microswitches are also wired to suitable devices piloting the tool feed movement of the spindle. To control the depth of the countersink, the position of the screws is adjusted in such a way that the distance between the tip of the screw and the corresponding microswitch is equal to the distance between the face of the collar and the tool, plus the countersink depth. During operation, the spindle of the machine continues to advance until the screws engage and trip the microswitches. At this point, the devices piloting the movement of the spindle will cause the tool to retract.

The applicant finds that prior art devices as outlined above are improvable in a number of ways.

More particularly, in the case of fully automatic multi-axis machines with numerical control, the integration of a drilling depth control device into a tool-holder will dictate the use, conventionally, of a number of single tool-holders corresponding to the number of operations carried out on the piece, given that after each operation the tool-holder is released from the spindle, by appropriate means, and replaced with a tool-holder carrying the tool for the next operation. A machine therefore has to be equipped with a plurality of tool-holders, each incorporating the depth-control device, which in comparison to standard tool-holders are much more expensive, and much heavier.

Moreover, given that the sensor serving to detect the displacement of the stop cage device in prior art embodiments is installed on the toolhead, near to the spindle, the setting of the sensor needs to be checked after every tool change, and this has the effect of slowing down operations even if the check is run automatically.

Also, the bearings coupling the stop cage to the tool-holder operate in a dust-laden environment and must therefore be shielded; consequently, spindle speeds must not exceed 16000 rev/min or thereabouts otherwise these components could overheat.

Given the situation outlined, the main object of the present invention is to provide a toolhead for a multi-axis machine tool substantially capable of overcoming the above noted drawbacks.

In particular, the object of the invention is to set forth a toolhead for multi-axis machine tools such as will perform depth-controlled machining operations on surfaces located at whatever height relative to the feed direction of the tool.

It is also an object of the invention to provide a toolhead for multi-axis machine tools that will allow such depth-controlled machining operations to be performed using standard tool-holders.

A further object of the invention is to provide a toolhead on which tool changes can be effected automatically, swiftly and reliably.

SUMMARY OF THE INVENTION

The declared main object and the other stated objects are substantially realized in a toolhead for multi-axis machine tools, comprising a support assembly, and a spindle, mounted to the support assembly, which carries a removable tool-holder and is rotatable about a relative machining axis so that a tool secured to the tool-holder can be set in rotation.

The toolhead further comprises a depth stop element, affording an active surface substantially transverse to the machining axis and positionable against the surface of a workpiece, mounted to the support assembly and capable of movement along the machining axis between an extended first position, distanced from the spindle, and a retracted second position of proximity to the spindle, also sensing means able to identify the position of the active surface relative to the support assembly and thus monitor the depth to which the tool penetrates the workpiece.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
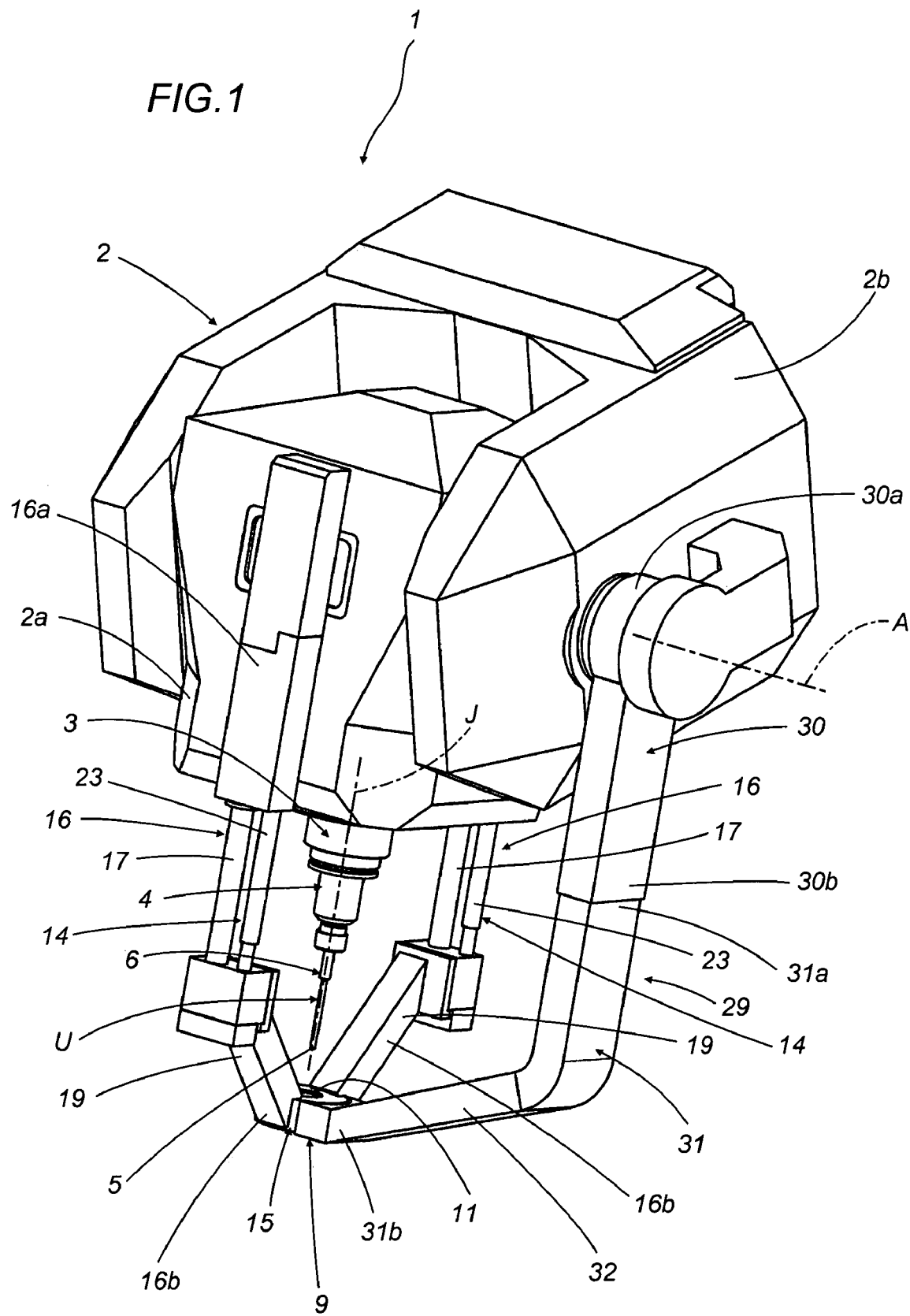
FIG. 1 illustrates a first embodiment of a toolhead for multi-axis machine tools according to the present invention, viewed in perspective and shown in a first operating position.

Referring to the drawings, 1 denotes a toolhead for multi-axis machine tools, in its entirety.

The toolhead 1 will be mounted generally to a numerically controlled multi-axis machine tool of conventional type, which is neither described in detail herein nor illustrated in the drawings.

The machine tool typically comprises a bed on which the toolhead 1 is mounted with freedom of movement, relative to the bed, along a plurality of positioning axes. The toolhead 1 is positioned on the various axes by drive means interlocked to a processing and control unit and serving also to govern the rotation of a tool about a respective machining axis on the basis of data programmed into the selfsame control unit.

The toolhead 1 comprises an assembly 2 designed to support a spindle 3 and, mounted to the spindle, a removable tool-holder 4 preferably of standard type, that is to say a given model or pattern regarded as universal and in widespread use within the art field concerned.

The spindle 3 turns on a relative machining axis denoted J and is set in motion by suitable drive means, not illustrated, so as to rotate a tool U clamped to the tool-holder 4 and machine the work.

The tool U can be of any given type normally reliant on knowledge of the machining depth.

For example, the tool U might be a drill bit, or a countersink, in other words a tool utilized to countersink the mouth of a hole.

Figure 2:
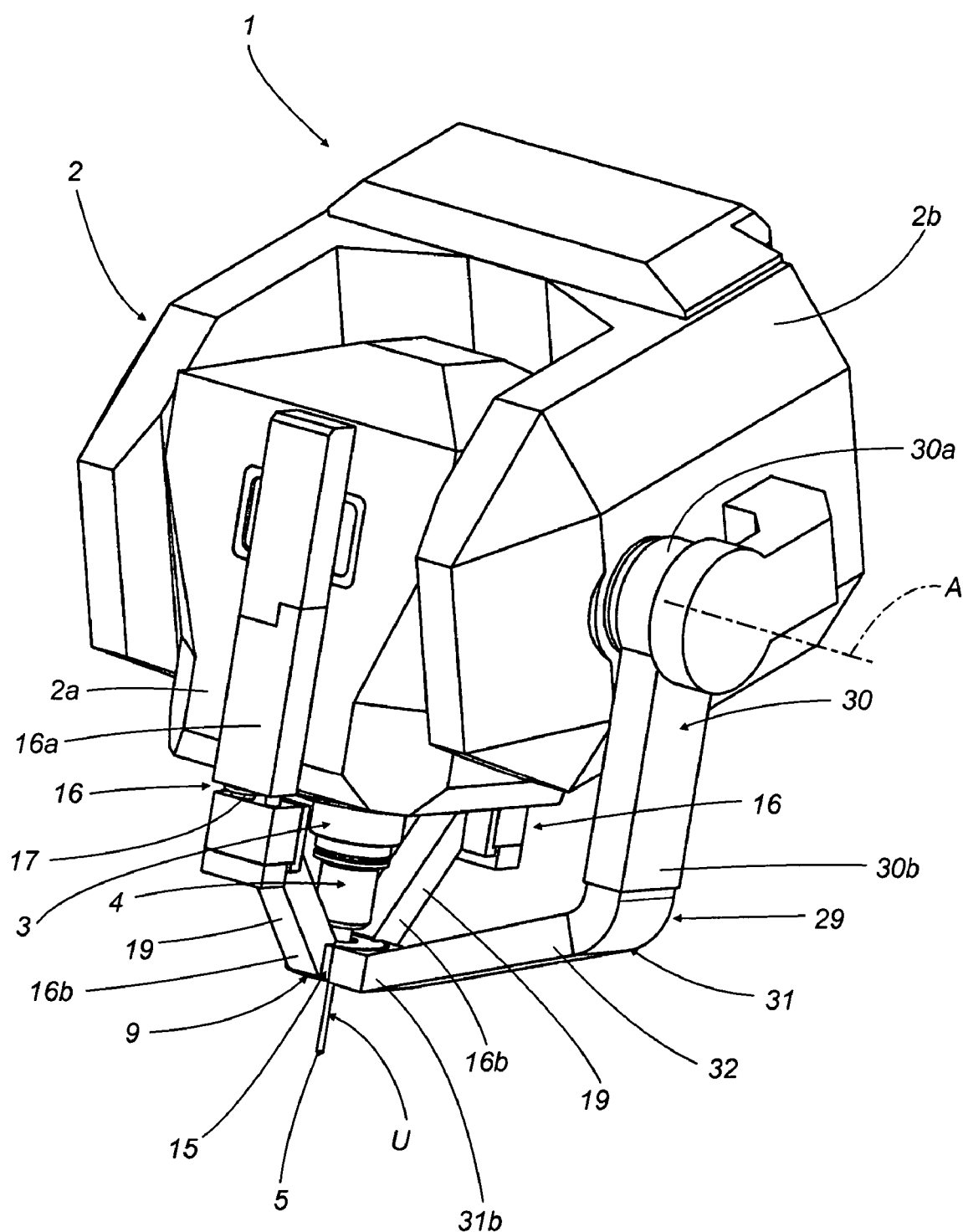
FIG. 2 shows the toolhead of FIG. 1 in a second operating position.
Figure 3:
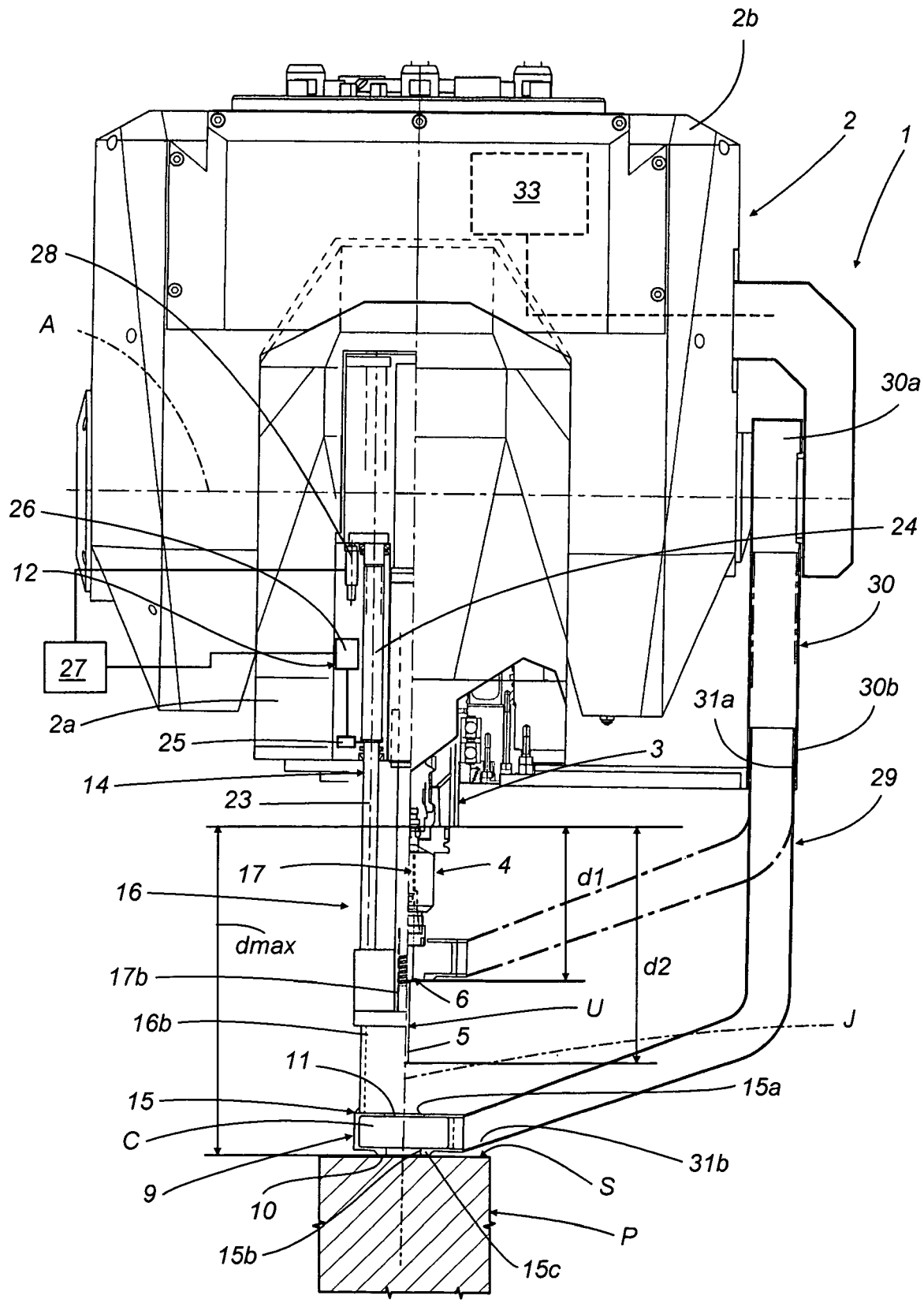
FIG. 3 shows the toolhead of FIGS. 1 and 2 in a first side elevation, cut away in part and with certain parts omitted better to reveal others, and with the second operating position indicated in phantom lines.
Figure 4:
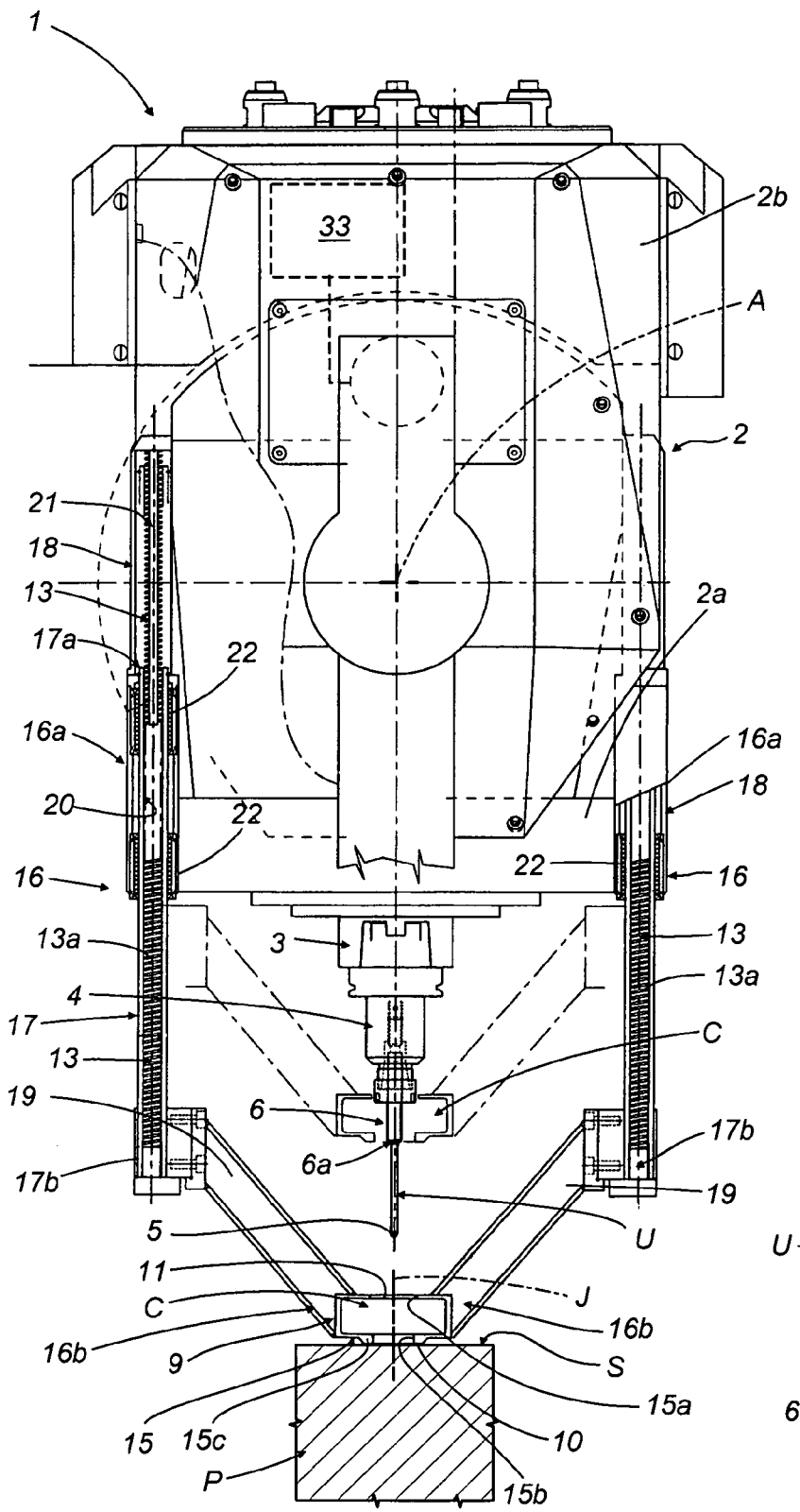
FIG. 4 shows the toolhead of FIGS. 1 and 2 in a second side elevation, cut away in part and illustrated in the two operating positions.
Figure 4A:
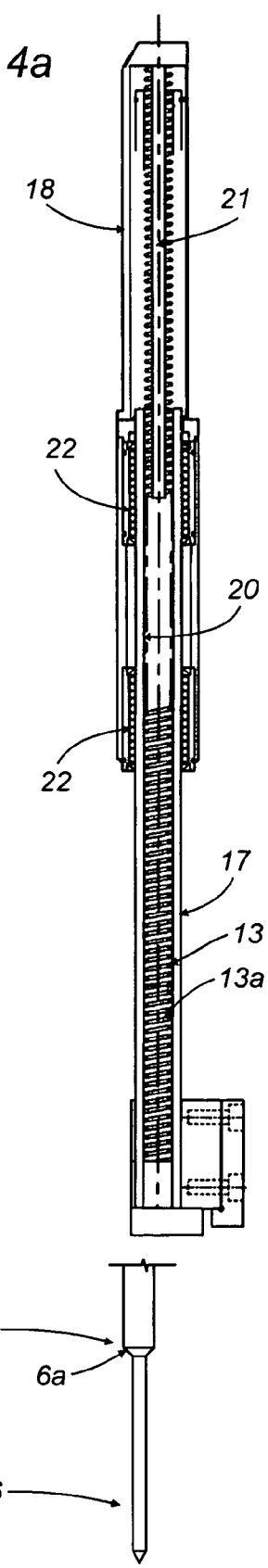
FIG. 4a is an enlarged detail of FIG. 4.

In the example of FIGS. 1 to 4 and FIG. 4a, the tool U comprises a drill bit 5 and a cutting portion 6 obtained by widening the shank of the tool U so as to create a frustoconical surface 6a that will countersink the hole made with the bit 5 (see detail of FIG. 4a).

Figure 5:
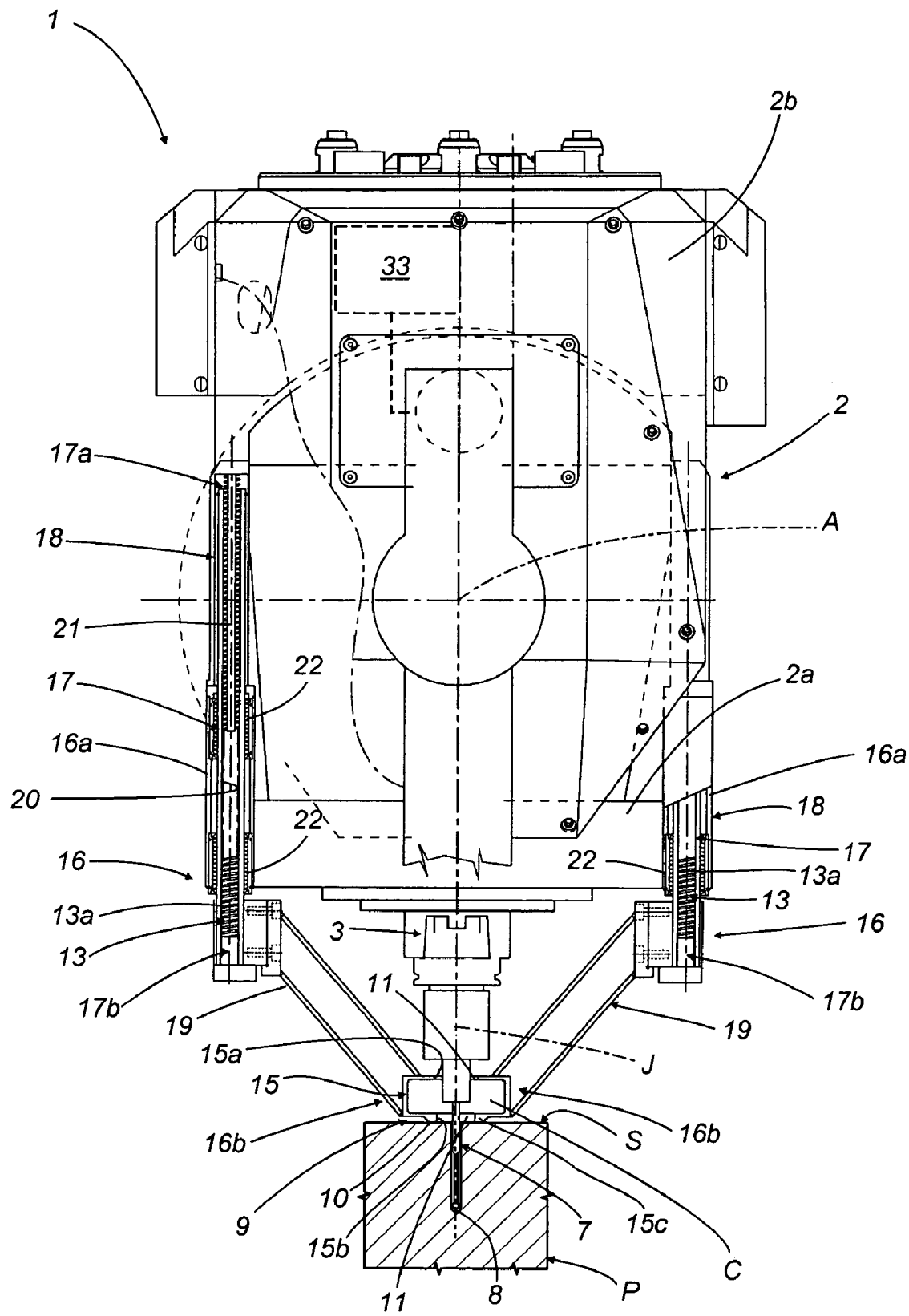
FIG. 5 shows the toolhead of FIG. 4, fitted with a probe tool and illustrated in the second operating position.

Alternatively, as illustrated in FIG. 5, the tool-holder 4 can carry a probe 7 with a ball tip 8 for checking the depth of holes.

In a preferred embodiment, as illustrated in the example of the accompanying drawings, the support assembly 2 presents a first supporting portion 2a carrying the spindle 3, and a second portion 2b such as can be anchored to the multi-axis machine tool. The first portion 2a is mounted hingedly to the second portion 2b and capable thus of pivoting about an axis A of articulation perpendicular to the machining axis J.

The toolhead 1 further comprises a depth stop element 9 presenting an active surface 10 disposed substantially transverse to the machining axis J and offered in contact to the machinable surface S of a workpiece P (FIGS. 3 and 4).

To advantage, the depth stop element 9 is mounted to the support assembly 2 and moreover rendered capable of movement thus along the machining axis J between an extended first position, distanced from the spindle 3, and a retracted second position of proximity to the spindle 3.

The active surface 10 of the depth stop element 9 is placed close to the machining axis J, so as to enter into contact with an area of the surface S close to the point at which the tool U enters the workpiece P.

Preferably, the active surface 10 encircles the machining axis J, delimiting and circumscribing a passage 11 afforded to the tool U. In the example illustrated, the active surface 10 takes the form of a circular collar concentric with the machining axis J and the tool U.

The geometry of the active surface 10 is such that when offered in contact to the workpiece P it will occupy a plane coinciding, at the point of contact, with the aforementioned surface of the selfsame workpiece P. In other words, the active surface 10 enters into full frontal contact with the surface S of the workpiece P. Also located in this same plane is the initial point of contact between the workpiece P and the tool U.

As illustrated in FIG. 3, the toolhead 1 is equipped with means 12 able to sense the position of the active surface 10 relative to the support assembly 2, such as will monitor the displacement of the active surface 10 relative to the support assembly 2, and, with the dimensions of the tool-holder 4 and of the current tool U both known, detect and control the depth to which the tool U penetrates the workpiece P.

With reference to the example of FIGS. 4 and 5, correct operation of the toolhead 1 is dependent on the action of spring means 13 operating between the support assembly 2 and the depth stop element 9. Such spring means 13 are designed to bias the depth stop element 9 toward the first position, distanced from the spindle 3, so that as long as the depth stop element 9 is unchecked, the active surface 10 will be maintained by the force of the springs at a maximum distance dmax from the spindle 3 and from the tool U (FIGS. 1 and 3).

With knowledge of the aforementioned maximum distance dmax and of the distance di between the spindle 3 and the cutting portion of the tool U, which coincides in the example of the drawings with the frustoconical surface 6a by which holes are countersunk, it becomes possible to establish the depth of penetration allowed to the cutting portion of the tool U by measuring a relative displacement between the support assembly 2 and the depth stop element 9, employing calculations of conventional type not described in detail here.

In the event that the tool U attached to the tool-holder 4 is the aforementioned probe 7, the toolhead 1 will also incorporate actuator means 14 (see FIGS. 1 and 3) such as will render the depth stop element 9 inactive by forcing it against the spring means 13 toward the second position, nearer the spindle 3 and away from the tip of the probe 7.

Considered relative to the feed direction of the tool U during machining, from the spindle 3 toward the bit 5, the depth stop element 9 occupies a position behind the tool U when in the retracted second position, and forward of the tool U when in the extended first position.

When in the first position and distanced from the spindle 3, moreover, the depth stop element 9 is separated from the tool U by a space sufficient to allow removal and replacement of the tool-holder 4, preferably utilizing automatic means of familiar embodiment, without touching or disturbing other parts of the head 1.

Finally, and to advantage, the toolhead 1 is equipped with conventional dust extraction means illustrated schematically as a block 33, associated with the depth stop element 9 and serving to effect the immediate removal of debris generated by the machining action at the point where the tool U enters the work.

More exactly, and referring to the example of FIGS. 1 to 5, the depth stop element 9 comprises a hollow body 15 encircling the machining axis J and affording a passage 11 for the tool U.

The hollow body 15 delimits an internal suction chamber C connected fluidically to the extraction means 33 (indicated by phantom lines in FIGS. 3, 4 and 5), which are mounted to the toolhead 1.

In the accompanying drawings, the hollow body 15 presents the shape substantially of a cylinder or a cone frustum of which the opposing bases afford openings 15*a* and 15*b* establishing the passage 11 for the tool U.

The opening 15*b* directed toward the workpiece P is also encircled entirely by an annular rim 15*c* defining the active surface 10 of the element 9.

The depth stop element 9 is caused to shift between the first and second positions by at least one motion-inducing arm 16, incorporated into the toolhead 1, of which a first end 16*a* is mounted to the support assembly 2 and a second end 16*b* is anchored permanently to the depth stop element 9.

In a preferred embodiment, as illustrated in the drawings, where the first supporting portion 2*a* carries the spindle 3 and the second portion 2*b* is anchorable to the multi-axis machine tool, the first end 16*a* of the at least one motion-inducing arm 16 is mounted to the first portion 2*a* of the support assembly 2.

The motion-inducing arm 16 comprises a rod 17 of which a first end 17*a* is carried slidably within a cylinder 18 mounted to the support assembly 2. A second end 17*b* of the rod 17, opposite to the first end 17*a*, is connected to the depth stop element 9.

The rod 17 extends parallel to and at a distance from the machining axis J and is joined to the depth stop element 9 by a connecting portion 19 angled relative to the machining axis J, extending from the second end 17*b* of the rod 17 to the depth stop element 9.

In the example of FIGS. 1 to 5, the toolhead 1 comprises two motion-inducing arms 16 positioned on opposite sides of the machining axis J. The rods 17 of the two arms 16 and the two angled connecting portions 19 are set at a distance such as will ensure there is sufficient clearance around the tool-holder 4 for it to be gripped, removed and replaced by automatic systems of familiar type.

Likewise in the example of FIGS. 1 to 5, the spring means 13 comprise at least one spring 13*a* operating between the cylinder 18 and the relative rod 17 of the motion-inducing arm 16.

More exactly, referring to FIGS. 4, 4*a* and 5, the rod 17 presents an axial cavity 20, and the spring 13*a*, a coil spring, is housed within the cavity 20 of the rod 17 and within the cylinder 18 along the full axial length of the assembled rod 17 and cylinder 18.

The spring 13*a* also ensheaths a pilot pin 21 rigidly associated and coaxially aligned with the cylinder 18.

To facilitate the movement of the rod 17 inside the cylinder 18 and ensure accurate guidance of the depth stop element 9 along a faultlessly straight trajectory, the rod 17 is carried by a pair of linear ball bearings 22 lodged internally of the cylinder 18 and spaced apart one from the other.

The aforementioned actuator means 14 consist in reciprocating pneumatic means installed in parallel with the cylinder 18 and rod 17, and associated preferably with each of the motion-inducing arms 16 (FIGS. 1 and 3).

Each of the pneumatic actuator means 14 presents a rod 23 accommodated slidably within a respective cylinder 24 of which the chamber is connected to a source 25 of compressed air, shown schematically as a block in FIG. 3.

The pneumatic means of the preferred solution are by no means mandatory however, but interchangeable with other actuator means, for example hydraulic, electric, etc.

Figure 6:
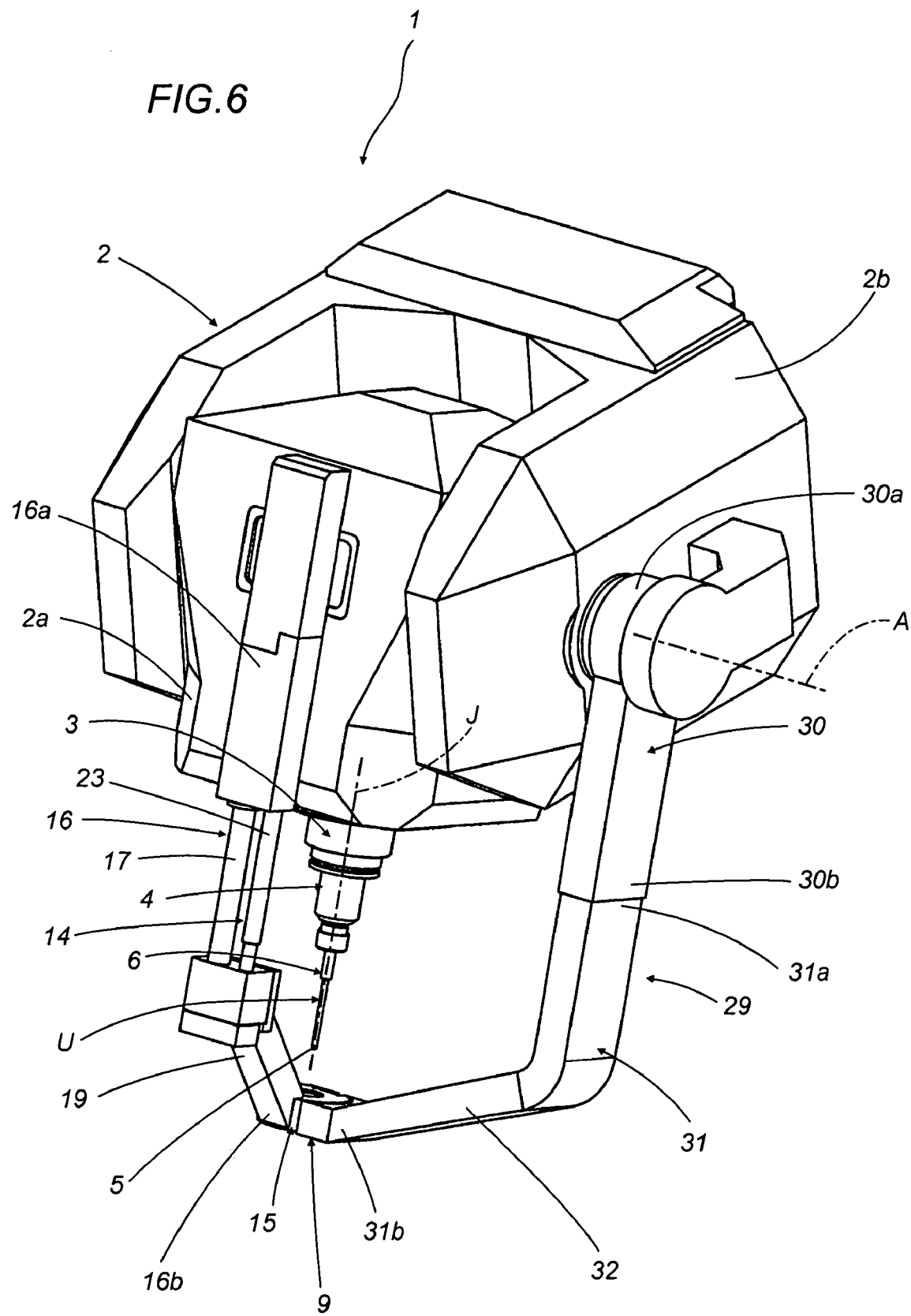
FIG. 6 illustrates a second embodiment of a toolhead as in FIG. 1, viewed in perspective.

It will be seen also that the embodiment shown in FIG. 6 differs from that of FIGS. 1 to 5 only in that there is just one motion-inducing arm 16, whilst the structure of the head 1 assumes a more simple configuration, thereby facilitating the tool change operation.

The aforementioned means 12 capable of sensing the position of the active surface 10 relative to the support assembly 2 will comprise at least one displacement sensor 26 connected to a processing unit 27, preferably one and the same as the master control processor of the machine, both of which illustrated schematically in FIG. 3 by blocks.

The sensor 26 can be of any given type able to provide the processing unit 27 with a signal that is a function of the relative displacement between the components in question, and preferably a signal proportional to this same displacement.

In a first solution, the displacement sensor 26 could be an LVDT (Linear Variable Differential Transformer) transducer, mounted between the support assembly 2 and the depth stop element 9.

In a second solution, the displacement sensor 26 could be a measuring probe mounted between the support assembly 2 and the depth stop element 9.

Alternatively, the displacement sensor 26 could be an inductive measurement transducer operating between the support assembly 2 and the depth stop element 9.

Again, the displacement sensor 26 could be a displacement laser sensor operating between the support assembly 2 and the depth stop element 9.

To initiate the measuring function, the sensing means 12 further comprise a switch 28, in this instance a microswitch, likewise connected to the processing unit 27, such as will trip and activate the displacement sensor 26 whenever there is a movement of the depth stop element 9 away from its first position, distanced from the spindle 3.

In a preferred embodiment, the toolhead 1 will present two microswitches 28, each mounted to a respective arm 16.

Like other components mentioned, the sensor 26 can be incorporated into the arm 16 and mounted in such a way, for example, as to detect the relative displacement between the cylinder 18, associated rigidly with the support assembly 2, and the rod 17 associated rigidly with the depth stop element 9, or between the cylinder 24 and the rod 23 of the actuator means 14.

The suction chamber C incorporated into the depth stop element 9 is connected fluidically with the extraction means 33 by way of a movable duct 29 such as will maintain the fluid connection during the movement of the depth stop element 9.

To advantage, as illustrated in FIGS. 1, 2 and 3, the duct 29 is telescopic and comprises a first section 30 presenting a first end 30*a* connected to the support assembly 2, also a second end 30*b* in which the first end 31*a* of a second section 31 is slidably inserted. The second end 31*b* of the second section 31 is connected to the hollow body 15 of the depth stop element 9.

The first section 30 extends parallel to the machining axis J and, like the rods 17 of the motion-inducing arms 16, is distanced from the machining axis J.

The second section 31 of the duct presents a boomerang-like profile and functions as a coupling portion 32 angled relative to the machining axis J and connecting with the depth stop element 9.

With the first section 3 set at a distance from the tool U, and the adoption of the angled coupling portion 32, the space around the tool-holder 4 is sufficient to allow its removal and replacement utilizing automatic means of familiar embodiment, making no contact with other parts of the head 1.

Finally, in the embodiment illustrated, the first end 30a presented by the first section 30 of the telescopic duct 29 is anchored hingedly to the second portion 2b of the support assembly 2, free to pivot on the aforementioned axis A of articulation perpendicular to the machining axis J and able thus to follow the angular movement described by the first portion 2a of the support assembly 2.

The description thus far having been concerned prevalently with structural aspects, the operation of the toolhead 1 according to the invention will now be described, and more exactly a drilling and countersinking operation performed with a tool U as illustrated in the drawings and described above.

The geometrical parameters of the toolhead 1, of the tool-holder 4 and of the tool U are known and will be fed into the processing unit 27. Known parameters, in particular, are the distance dmax mentioned above, also the distance d1 between the spindle 3 and the frustoconical cutting portion 6, and the distance d2 between the spindle 3 and the drill bit 5 of the tool U.

The processing unit 27 is also programmed to perform a set number of drilling and countersinking strokes over a known theoretical surface, each to predetermined sink and countersink depths.

The machine initiates the work cycle by offering the toolhead 1 to the workpiece P with the depth stop element 9 in the first position, hence at the maximum distance dmax from the spindle and from the tool U.

As the active surface 10 enters into contact with the workpiece P, the depth stop element 9 remains stationary against the surface S to be machined whilst the support assembly 2 and the tool U continue to advance. As a result of the relative movement between the depth stop element 9 and the support assembly 2, the switch 27 is tripped and the displacement sensor 26 activated. The value measured by the displacement sensor 26 provides an indication from one instant to the next of the position occupied by the drill bit 5 and by the frustoconical surface 6 of the tool U, relative to the surface S of the work, hence knowledge of the effective drilling and countersinking depth. Once the effective sink/countersink depths match the programmed values, the toolhead 1 is piloted to retract by the processing unit 27, ready for a new cycle.

Where different tools are needed to perform an operation, the depth stop element 9 is returned by the spring means 13 to the maximum distance from the spindle 3, and the gripper of an automatic tool magazine will be able to detach and replace the tool-holder 4 without any other part of the head 1 being disturbed.

Finally, when using the probe 7 to check drilling depths, the depth stop element 9 will be retracted by the actuator means 14 into the second position of proximity to the spindle 3. More exactly, the source 25 of compressed air is interlocked to the processing unit 27 and will be piloted to send air into the cylinder 24, thereby drawing the rod 23 back into the selfsame cylinder 24.

Thus, when the active surface 10 engages the workpiece P, the sensor 26 responds and, depending on the type of sensor employed, the sequence of steps will be as follows:

if the sensor is a simple ON/OFF type (mechanical microswitch, inductive or capacitive transducer, etc.), the distance to be covered is counted using the measurement systems of the machine, taking into account the directional alignment of the axis J;

if the sensor is a distance-measuring type giving an output proportional to the effective distance, the procedure is as described above, or considering the measurement system of the machine and comparing the value read by the sensor 26. This introduces redundancy into the machining operation, so as to avoid damage either to the workpiece P or to the machine.

Figure 7:
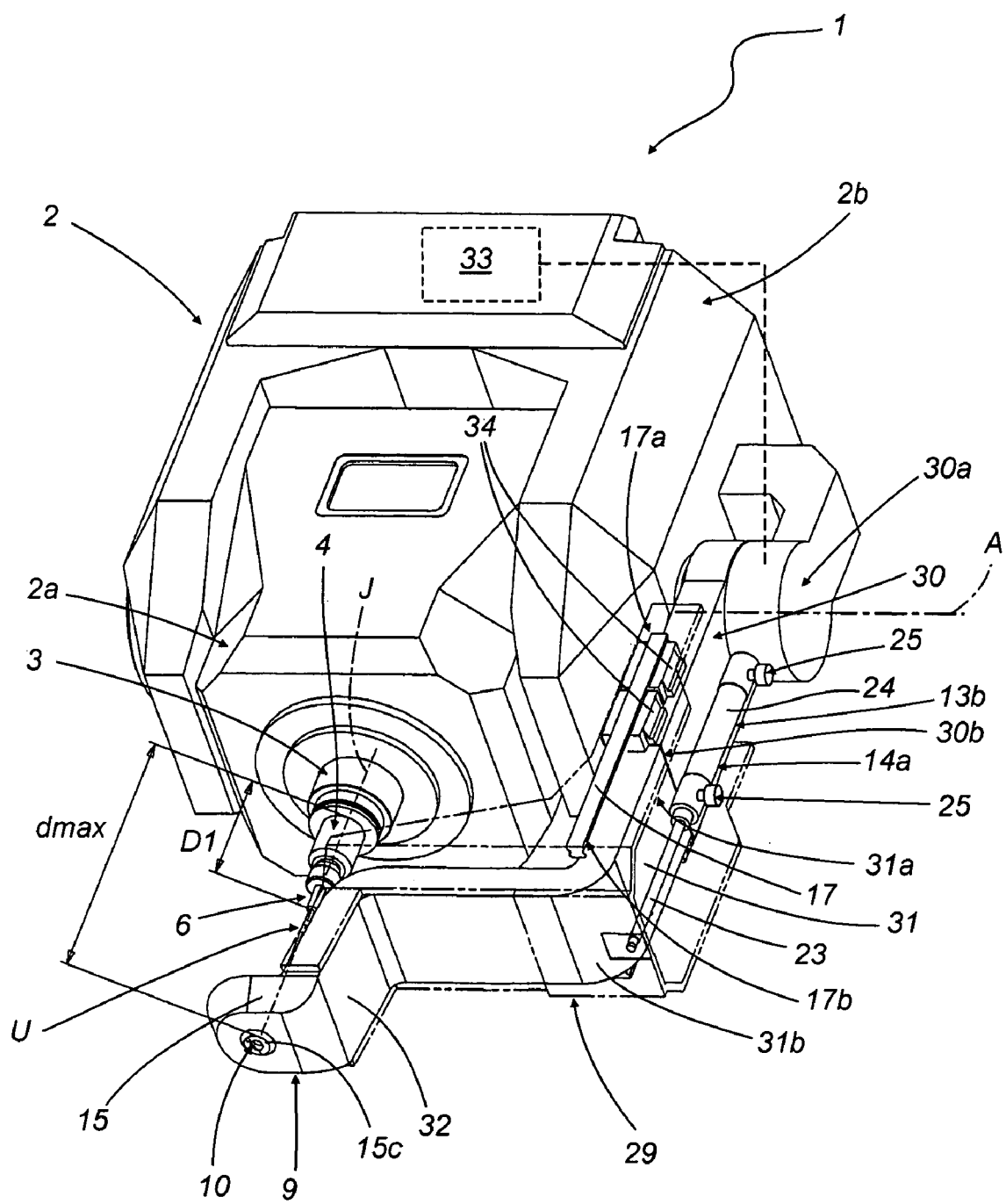
FIGS. 7 and 8 illustrates a further embodiment of the toolhead as in FIG. 1, respectively in a first and in a second operating position.
Figure 8:
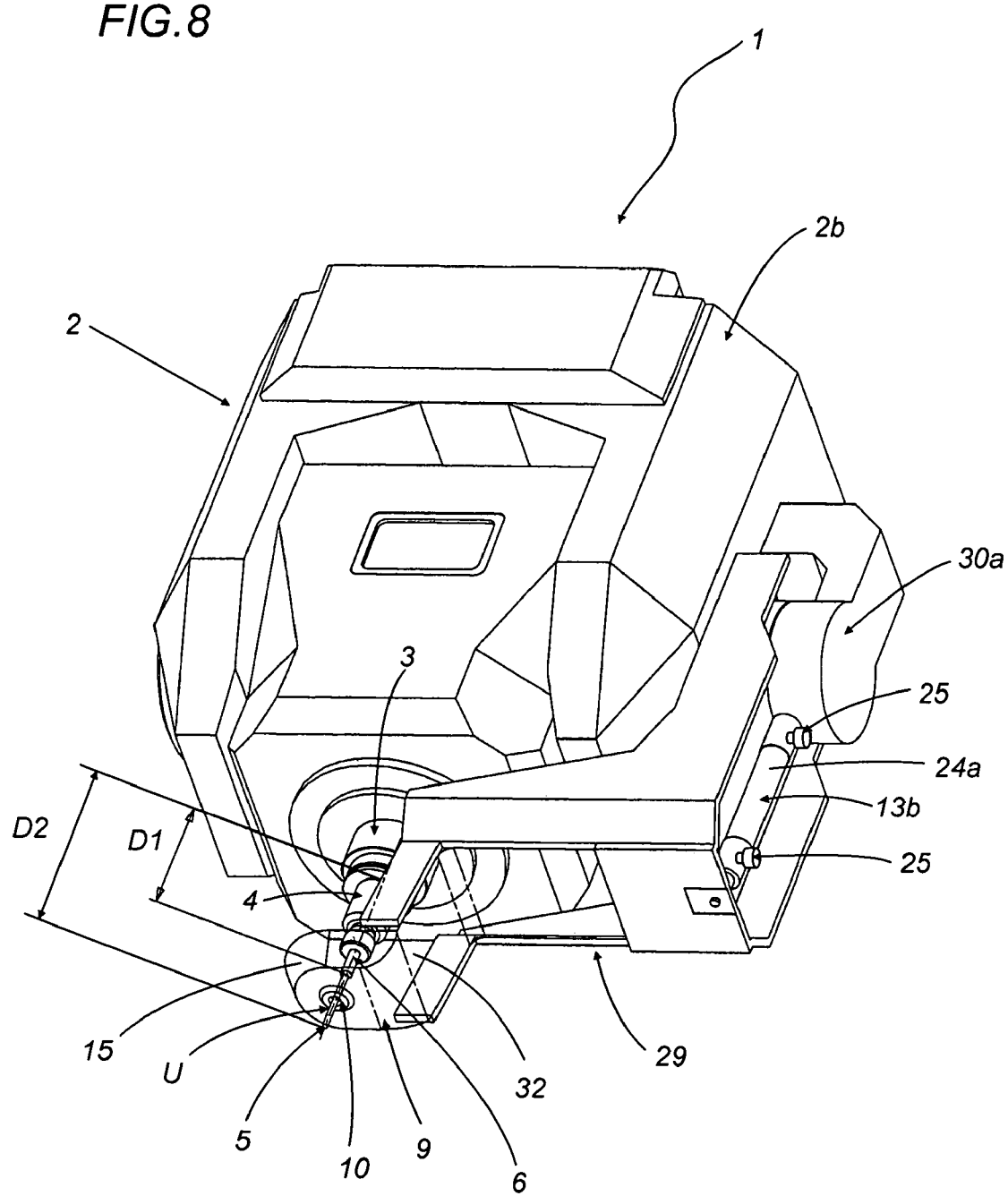

In the alternative embodiment of FIGS. 7 and 8, the actuator means 14 serving to retract the depth stop element 9 to the second position of proximity to the spindle 3 and distance it from the tip of the gauge 7, and the arm 16, are both replaced by actuator means 14a consisting in a single pneumatic cylinder 24a with a relative rod 23a, which also replaces the spring means 13.

The cylinder 24a is connected to the second portion 2b, and the end of the rod 23a is anchored to the telescoping section 31a of the duct 29.

With this arrangement, accordingly, the pneumatic cylinder 24a also functions as the single arm 16 able to displace the depth stop element 9 between the two positions.

In the example of FIGS. 7 and 8, the telescopic duct 29 presents a first section 30 with a first end 30a connected to the support assembly 2, and a second end 30b into which the first end 31a of a second section 31 is slidably inserted. The second end 31b of the second section 31 is connected to the hollow body 15 of the depth stop element 9. In this instance the hollow body 15 is substantially frustoconical in shape.

The first section 30 extends parallel to the machining axis J and is distanced from this same axis J.

The second section 31 of the duct presents a profile of "S" outline with a final connecting portion 32 angled relative to the machining axis J and joined to the hollow body 15 of the depth stop element 9.

In this embodiment, also, the first end 30a of the first section 30 of the telescopic duct 29 is anchored hingedly to the second portion 2b of the support assembly 2, free to pivot on the axis A of articulation perpendicular to the machining axis J and able to follow the angular movement described by the first portion 2a of the support assembly 2.

The toolhead 1 of FIGS. 7 and 8 also comprises rods 17, each connected by the one end 17a to one end 30a of the first section 30 of the telescopic duct 29, and by the other end 17b to the opposite end 30b of the first section 30. The rods 17 are slidable within respective shoes 34 and serve to stabilize the duct 29 when telescoping.

As in the examples of FIGS. 1 to 6, so in that of FIGS. 7 and 8, debris is removed from the machining area by dust extraction means 33, through the hollow body 15 and the duct 29.

With the pneumatic cylinder 24a connected to the aforementioned source 25 of compressed air, pilot pressure and directional control can be utilized selectively to:

keep the depth stop element 9 tight against the workpiece P, applying a force proportional to the air pressure supplied by the source 25;

retract the hollow body 15 when the probe 7 is in use.

It will be seen that the pneumatic cylinder 24a also performs the function of spring means 13a able to bias the depth stop element 9 toward the first position, distanced from the spindle 3.

In operation, the toolhead 1 of FIGS. 7 and 8 is no different to that illustrated in FIGS. 1 to 5 and in FIG. 6.

The drawbacks encountered with the prior art are overcome by the present invention, and the objects stated at the outset thus realized.

First and foremost, the toolhead for multi-axis machine tools according to the invention assures accurate and continuous control of the machining depth at every moment of the process, even when machining a surface of which the exact height may not be known.

In addition, the toolhead disclosed will allow machining at controlled depth using tool-holders of standard design which are more economical, smaller and lighter, and more easily obtainable than those utilized typically hitherto for applications of the type in question.

The toolhead according to the present invention allows rapid and fully automatic replacement of the tool-holder, without any part of the head or the machine needing to be removed. In particular, there is no need to dismantle the dust extraction port.

Again, given that the depth stop element of a toolhead according to the invention is not mounted to the tool-holder by way of shielded bearings, the speed of rotation of the spindle is not limited.

Lastly, the depth stop element of the toolhead disclosed can be shifted to a non-active position, for example to allow the use of a probe, without the element itself being detached from the support component.

The above noted advantages translate into minimal down times between work cycles, and consequently optimized production.

The invention claimed is:

1. A toolhead for multi-axis machine tools, comprising: a support assembly;
   a spindle mounted to the support assembly, carrying a removable tool-holder and rotatable about a relative machining axis in such a way that a tool secured to the tool-holder can be set in rotation;
   a depth stop element, affording an active surface substantially transverse to the machining axis and positionable against the surface of a workpiece, which is mounted to the support assembly by a motion-inducing arm extending parallel to and at a distance from the machining axis and by a connecting portion angled relative to the machining axis, and which is capable of movement along the machining axis between an extended first position, distanced from the spindle by sufficient space to allow easy removal and replacement of the tool-holder, and a retracted second position of proximity to the spindle, during which the tool enters the workpiece;
   sensing means able to identify the position of the active surface relative to the support assembly and thus monitor the depth to which the tool penetrates the workpiece.

2. A toolhead as in claim 1, further comprising dust extraction means connected to the depth stop element and serving to remove machining debris.

3. A toolhead as in claim 2, wherein the depth stop element comprises a hollow body encircling the machining axis, in such a way as to afford a passage admitting the tool, and delimiting a suction chamber connected fluidically to the dust extraction means.

4. A toolhead as in claim 1, wherein the active surface encircles the machining axis and affords a passage to admit the tool.

5. A toolhead as in claim 1, further comprising spring means by which the depth stop element is biased toward the extended first position distanced from the spindle.

6. A toolhead as in claim 5, comprising actuator means by which the depth stop element is drawn toward the retracted second position of proximity to the spindle, against the action of the spring means, so as to render the depth stop element inactive at least when the tool fined to the toolholder is a probe.

7. A toolhead as in claim 6, comprising at least one arm by which motion is induced in the depth stop element, presenting a first end mounted to the support assembly and a second end anchored to the depth stop element.

8. A toolhead as in claim 7, wherein the at least one motion-inducing arm comprises a rod of which a first end is carried slidably in a cylinder mounted to the support assembly, and a second end opposite to the first end is connected to the depth stop element.

9. A toolhead as in claim 8, wherein spring means include at least one spring operating between the cylinder and the rod of the at least one motion-inducing arm.

10. A toolhead as in claim 9, wherein the actuator means are reciprocating pneumatic means installed in parallel with the cylinder and the rod of the at least one motion-inducing arm.

11. A toolhead as in claim 10, wherein the rod extends parallel with and at a distance from the machining axis, and the motion-inducing arm further comprises a connecting portion extending from the second end of the rod to the depth stop element.

12. A toolhead as in claim 7, comprising two motion-inducing arms located on opposite sides of the machining axis.

13. A toolhead as in claim 7, further comprising a telescopic duct connecting the suction chamber with the dust extraction means in such a way as to maintain the fluid connection between the suction chamber and the extraction means during the movement of the depth stop element.

14. A toolhead as in claim 13, wherein the support assembly comprises a first portion carrying the spindle and a second portion, of which the first portion is mounted hingedly to the second portion and capable thus of pivoting about an axis of articulation normal to the machining axis.

15. A toolhead as in claim 14, wherein the first end of the at least one motion-inducing arm is mounted to the first portion of the support assembly and the telescopic connecting duct presents a first end mounted hingedly to the second portion of the support assembly, capable of pivoting about the axis of articulation normal to the machining axis.

16. A toolhead as in claim 1, wherein sensing means able to identify the position of the active surface relative to the support assembly comprise at least one displacement sensor.

17. A toolhead as in claim 16, wherein the displacement sensor is an LVDT transducer mounted between the support assembly and the depth stop element.

18. A toolhead as in claim 16, wherein the displacement sensor is a measuring probe mounted between the support assembly and the depth stop element.

19. A toolhead as in claim 16, wherein the displacement sensor is an inductive measuring transducer operating between the support assembly and the depth stop element.

20. A toolhead as in claim 16, wherein the displacement sensor is a laser displacement sensor operating between the support assembly and the depth stop element.

21. A toolhead as in claim 16, wherein the sensing means further comprise at least one switch serving to activate the at least one displacement sensor in response to a movement of the depth stop element away from the first position distanced from the spindle.

22. A toolhead as in claim 1, wherein the depth stop element is separated from the tool, when occupying the first position distanced from the spindle, sufficiently to allow removal and replacement of the tool-holder.

23. A toolhead as in claim 1, comprising a pneumatic cylinder functioning as at least one solitary motion-inducing arm able to move the depth stop element between the first and second positions.

24. A toolhead as in claim 23, wherein the pneumatic cylinder performs the function of spring means by which the depth stop element is biased toward the first position, distanced from the spindle.

\* \* \* \* \*